United States Patent [19]
Briggs et al.

[11] Patent Number: 5,180,895
[45] Date of Patent: Jan. 19, 1993

[54] MICROWAVE HEATING APPARATUS

[75] Inventors: David H. Briggs, Silchester; Richard F. Freeman, Linton, both of Great Britain

[73] Assignee: Unilever Patent Holdings B.V., Netherlands

[21] Appl. No.: 671,831

[22] PCT Filed: Sep. 28, 1989

[86] PCT No.: PCT/GB89/01149
§ 371 Date: May 22, 1991
§ 102(e) Date: May 22, 1991

[87] PCT Pub. No.: WO90/03715
PCT Pub. Date: Apr. 5, 1990

[30] Foreign Application Priority Data
Sep. 28, 1988 [GB] United Kingdom ............... 8822708

[51] Int. Cl.⁵ .............................................. H05B 6/72
[52] U.S. Cl. ...................... 219/10.55 F; 219/10.55 A; 219/10.55 E

[58] Field of Search ................. 219/1055.E, 10.55 A, 219/10.55 F, 10.55 R; 99/DIG. 14, 451; 426/243

[56] References Cited
U.S. PATENT DOCUMENTS

| | | | |
|---|---|---|---|
| 2,820,127 | 1/1958 | Argento et al. | 219/10.55 E |
| 2,856,497 | 10/1958 | Rudenberg | 219/10.55 E |
| 2,956,144 | 10/1960 | Woodman | 219/10.55 R |
| 4,752,663 | 6/1988 | Meisel | 219/10.55 F |

Primary Examiner—Philip H. Leung
Attorney, Agent, or Firm—Lee, Mann, Smith, McWilliams, Sweeney & Ohlson

[57] ABSTRACT

A microwave heating apparatus comprises a heating chamber with a hemispherical reflecting cover (24). Microwave energy is thereby focussed onto foodstuff (34) contained in the chamber from at least two magnetrons (10 and 12) which feed microwave energy through flared metal waveguides (14 and 16).

9 Claims, 1 Drawing Sheet

MICROWAVE HEATING APPARATUS

FIELD OF THE INVENTION

This invention concerns microwave-powered heating devices, and in particular heating apparatus for heating foodstuffs, more particularly for defrosting and heating to a serving temperature frozen pre-cooked foodstuffs.

Background to the Invention

With the increasing demand for quick, hot snacks and so-called "fast food", there is an increasing requirement to be able to process frozen pre-cooked foodstuffs ready for consumption. In particular, it is necessary to be able to heat up from the frozen condition a pre-cooked foodstuff to a serving temperature in the shortest possible time, and typically a temperature change from $-17°$ C. to $+74°$ C. must be achieved. Preferably the time should be as short as possible and ideally should be well under one minute.

Conventional microwave ovens are not particularly well suited to this function, and it has been proposed to concentrate the available energy by providing concave or other appropriately-shaped reflecting surface within a chamber into which microwave energy is transmitted so that the latter is focused generally into the region of the chamber in which the foodstuff is located. In this way the energy is concentrated into the foodstuff and the latter is raised in temperature at the maximum possible rate.

It is an object of the present invention to provide a more uniform heating of a foodstuff within a chamber in which microwave energy is intentionally reflected and thereby focussed onto the foodstuff.

SUMMARY OF THE INVENTION

According to the present invention there is provided heating apparatus comprising a heating chamber in which a foodstuff is to be heated using microwave energy which is focussed onto the foodstuff by means of appropriate reflecting surfaces within the chamber, and at least two independent microwave sources for supplying microwave energy to the chamber so as to reduce the risk of standing waves being set up within the chamber thereby resulting in a more uniform heating-through of the foodstuff, the microwave energy being directed through wave guides whose cross sections increase from relatively small circular or rectangular cross section inputs to two or more outlets which cooperate together to describe a complete annulus, the outer diameter of which annulus corresponds to the diameter of the reflecting surfaces within the chamber and the inner diameter of which annulus corresponds to the diameter of (or comprises the walls of) a circular platform on which the foodstuff is to be located.

Alternatively, a concentration of standing waves may be achieved, centred around and in the foodstuff being heated within the chamber.

The design of the focussing elements and the arrangements within the cavity are preferably matched to the shape and structure and composition of the foodstuff. This matching may be achieved by empirical means, or by computer or mathematical modelling of the E-field within the cavity.

According to a preferred feature of the invention, the apparatus is such that microwave energy entering the chamber does not impinge directly on the foodstuff but can only reach the foodstuff after being reflected at least once.

According to a further preferred feature of the invention, the interior of the chamber is formed at least in part with a concave microwave energy reflecting surface, typically in the form of a dome. The microwave energy from the plurality of microwave sources is directed towards perimeter region of the concave surface to be reflected therefrom and generally focused towards the centre of the chamber where the foodstuff is to be located, so that it is in fact prevented from reaching the foodstuff other than by first being reflected by the perimeter regions of the concave reflector either directly onto the foodstuff or onto a microwave reflecting surface situated below the foodstuff so that microwave energy incident thereon is reflected up onto the underside of the foodstuff.

By locating the foodstuff on a microwave transparent platform, above the microwave reflecting surface, so microwave energy reflected by the latter can pass through the platform and through the foodstuff to be reflected by the concave reflecting surface back again towards the foodstuff.

In this way virtually all of the microwave energy introduced into the chamber will be reflected one way or another into the foodstuff, and this substantially decreases the time required to heat a standard foodstuff from its frozen condition to serving temperatures. In a typical example, an item weighing 180 grams and containing 50% water was heated from $-17°$ C. to $+74°$ C. in 50 seconds using electrical energy readily available from a standard domestic 13 amp ring-main socket.

The microwave sources, e.g. magnetrons, are conveniently coupled to wave guides feeding the chamber by "Magic-T" couplings or the like.

Although a circular array of wave guides is the ideal, an improvement has also been obtained by merely using two wave guides directing microwave energy onto two diametrically opposite regions of the concave reflecting surface. More magnetrons may be employed, equally spaced.

The wave guides and magnetrons may be located within a base unit and the concave reflector may form part of a hinged domed lid which when closed seals the chamber against the egress of RF energy.

Where a food product is to be browned, a microwave absorbing plate may be located within the chamber which with the incidence of microwave energy thereon becomes heated and emits infra-red radiation for heating and browning the surface of the foodstuff. Such a browning aid may be introduced into the chamber during the heating process or may be permanently located within the chamber. In the latter event, means is preferably provided for either shielding the browning-aid from microwave energy until a particular part of the heating cycle has been reached, or means is provided in, or associated with, the wave guides to deflect or otherwise de-tune the emission of microwave energy for a portion of each heating cycle so as to largely prevent microwave energy from being incident on the browning aid until an appropriate time in the heating cycle.

A platform which is required to be transparent to microwaves may be formed from a plastics material, glass or a ceramic material.

The microwave-reflecting surfaces and the wave guides of the apparatus will typically be formed from metal.

BRIEF DESCRIPTION OF THE DRAWINGS

The invention will now be described, by way of example, by reference to the accompanying drawings in which.

DETAILED DESCRIPTION OF THE PREFERRED EMBODIMENT

Figure 1:
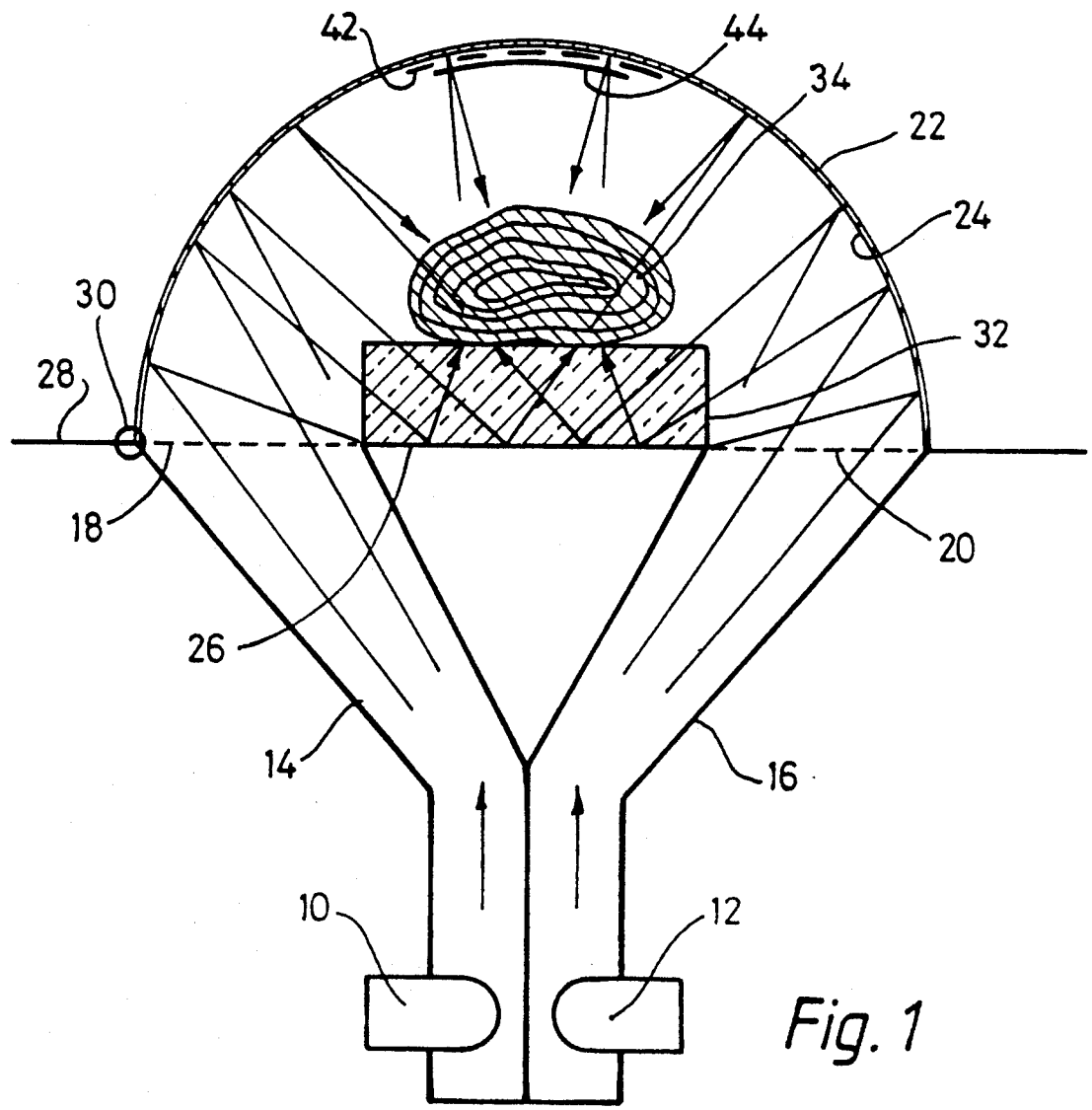
FIG. 1 is a cross-sectional schematic view of a heating chamber embodying the invention.

In FIG. 1 two magnetrons 10 and 12 are located at the lower ends of two flared metal wave guides 14 and 16, respectively, which terminate in openings in a flat circular plate at 18 and 20, respectively, the plate forming the flat circular base of a hemispherical cooking compartment which is closed by a hemispherical cover 22 the internal surface of which at 24 is formed from microwave reflecting material such as metal. The plate 20 consists of microwave-transparent material.

The plate containing the apertures 18 and 20 is designated by reference numerial 26 and a surrounding surface 28 may comprise a worktop or the upper surface of a housing within which the magnetrons and wave guides are located.

A hinge 30 joins the domed cover 22 to the surface 28.

Mounted centrally on the plate 26 is a support platform 32 formed from glass, plastics or ceramic material which is transparent to microwaves, and a foodstuff 34 is shown located on the platform 32.

Figure 2:
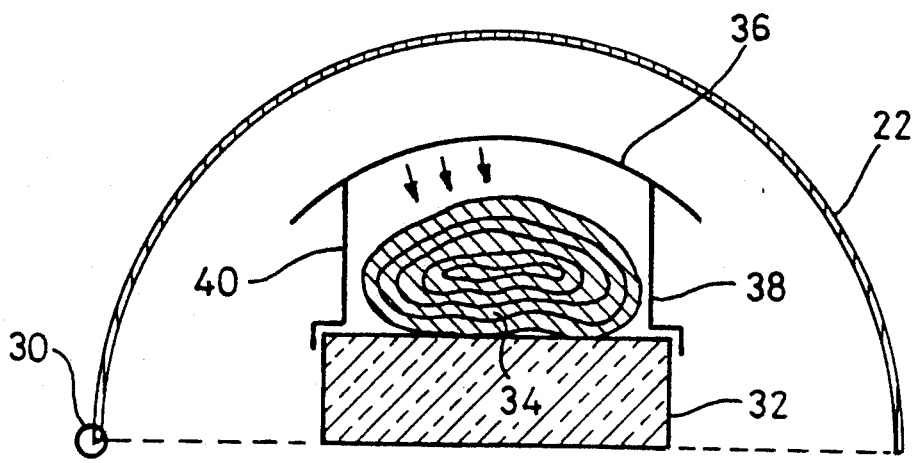
FIG. 2 illustrates how a browning aid may be located within the chamber to complete a heating and food preparing cycle.

Microwave energy eminating from either of the apertures 18 and 20 cannot impinge directly on the foodstuff 34 but must first be reflected from the domed surface 24 and may have to be reflected from the planar surface 26 before the energy can reach the foodstuff.

Where a browning-aid is to be used in the heating process, the simplest procedure is terminate the heating cycle at an appropriate point, open the lid 22 and locate within the chamber the browning-aid. As shown in FIG. 2, the latter comprises a dished plate 36 carried by supports 38 and 40 which are adapted to clip over the corners of the platform 32. The browning aid absorbs microwave energy and becomes hot in the process and thereby emits infra-red radiation.

However, in an arrangement according to the invention shown in FIG. 1, a shell 42 of microwave-absorbing heat resistant material is mounted inside the domed lid. This shell is of low mass, and is thermally isolated from the main body of the domed lid 22. The shell 42 is shielded by a removable member 44 until a particular part of the heating cycle has been reached.

Although not shown, the outer surface of the plate 36 may be coated in such a way as to restrict the amount of infra-red radiation given off in a direction away from the foodstuff so that the majority of the radiation is in fact directed towards the foodstuff to brown the surface thereof.

We claim:

1. Microwave heating apparatus comprising a heating chamber in which a foodstuff is to be heated using microwave energy; a circular reflecting surface mounted in the chamber by which microwave energy is focussed onto the foodstuff; two independent microwave sources for supplying microwave energy to the chamber so as to result in a more uniform heating-through of the foodstuff; a waveguide connected to each said source for directing microwave energy to the chamber, the cross-sections of the waveguides increasing from relatively small cross-sections to at least two outlets which cooperate together to describe a complete annulus whose outer diameter corresponds to the diameter of said reflecting surface and whose inner diameter corresponds to the diameter of said circular platform; a browning aid located within the chamber; and means for shielding the browning aid from microwave energy until a particular part of the heating cycle has been reached so as largely to prevent microwave energy from being incident on the browning aid until an appropriate time in the heating cycle.

2. Apparatus according to claim 1 in which the focussing means are matched to the shape and structure and composition of the foodstuff.

3. Apparatus according to claim 1 in which the apparatus is such that microwave energy entering the chamber does not impinge directly on the foodstuff but can only reach the foodstuff after being reflected at least once.

4. Apparatus according to claim 1 in which the interior of the chamber is formed at least in part with a concave microwave energy reflecting surface in the form of a dome.

5. Apparatus according to claim 4 in which the microwave energy from the two microwave sources is directed towards a perimeter region of said reflecting surface to be reflected therefrom and generally focussed towards the centre of the chamber where the foodstuff is to be located, so that it is first reflected by the perimeter region.

6. Apparatus according to claim 4 in which said waveguides direct microwave energy onto two diametrically opposite regions of said reflecting surface.

7. Apparatus according to claim 1 in which the two microwave sources are coupled to said waveguides feeding the chamber.

8. Apparatus according to claim 1 in which the two microwave sources and waveguides are located within a base unit, and said reflecting surface forms part of a hinged dome lid which when closed seals the chamber against the egress of RF energy.

9. Apparatus according to claim 1 in which the microwave reflecting surfaces and the waveguides are formed from metal.

* * * * *